Oct. 21, 1947.  R. E. SWAIN  2,429,379

PERFORATED FACE DISPLAY

Filed Feb. 2, 1944  2 Sheets-Sheet 1

INVENTOR.
Roy E. Swain
BY Carlos G. Stratton
ATTORNEY.

Oct. 21, 1947.  R. E. SWAIN  2,429,379
PERFORATED FACE DISPLAY
Filed Feb. 2, 1944     2 Sheets-Sheet 2
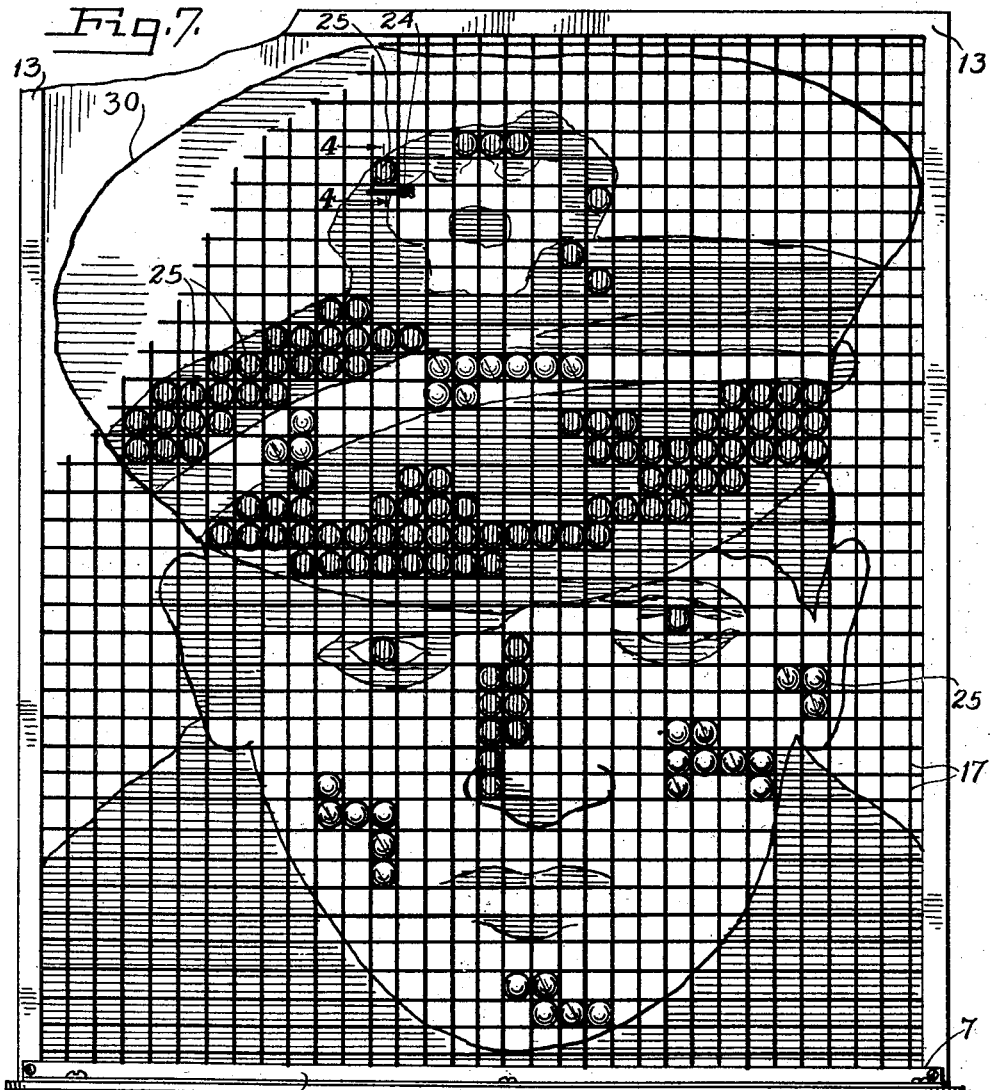
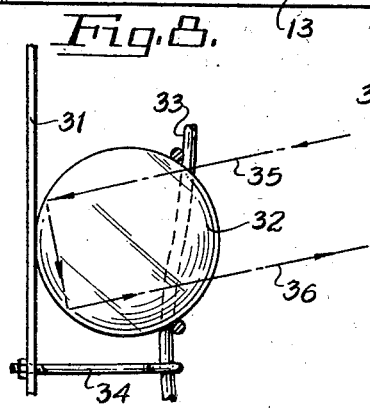
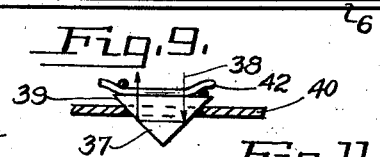
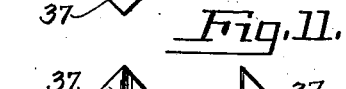
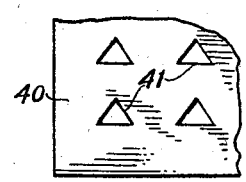
INVENTOR.
Roy E. Swain
BY Carlos G. Stratton
ATTORNEY.

Patented Oct. 21, 1947

2,429,379

UNITED STATES PATENT OFFICE 2,429,379

PERFORATED FACE DISPLAY

Roy E. Swain, Huntington Park, Calif.

Application February 2, 1944, Serial No. 520,785

6 Claims. (Cl. 40—133)

My invention relates to a display means for highway markers, store signs, billboards, works of art, and for many other uses.

The principle of the invention is similar to that of half-tone printing or resembling needle-point art work, except that the present invention employs a series of lenses, spheres, reflectors or the like arranged in predetermined lines (e. g., straight or even curved lines) to produce a design, picture or wording. The lenses, spheres, reflectors and the like may be glass, plastic or other suitable translucent material. It is preferred that such elements be of varying colors and be lighter and darker.

At a distance the individual elements fuse together in a single pattern that makes an attractive design, picture or wording. When the reflector type of display is used, it is suitable for highway markers and other displays that receive their illumination from automobile headlights, floodlights or other external source.

An object of the invention is to provide "display means," which in this description and in the hereunto appended claims shall be taken to mean markers, signs, billboards, works of art, and the like.

My invention also has for its objects to provide positive means for maintaining the series of elements in desired positions, and to provide mounting means that are economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 7 is a diagrammatic face view of means to simulate half-tone printing by means of translucent spheres.

Fig. 8 is a sectional view of a modified construction.

Fig. 9 is a sectional view of a still further modified form.

Fig. 10 is an elevation of a "cube corner" lens.

Fig. 11 is an elevational view of a side of the latter lens.

Fig. 12 is a broken face view of a plate to be used with the cube corner type of lens.

Figure 1:
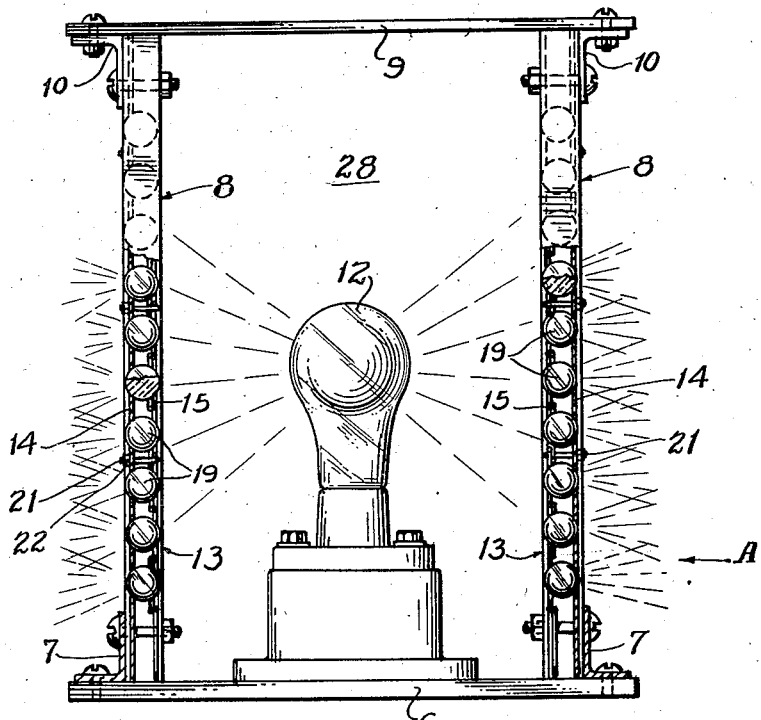
Fig. 1 is a side elevation, partly in section, of an embodiment of my invention.

Referring more in detail to the drawings, the reference numeral 6 indicates any suitable base for the form shown in Fig. 1. Angle brackets 7 are bolted to the base 6 and to uprights that are generally designated by the number 8. A top plate 9 spans the space between, and is mounted upon, the upright members 8. Angle brackets 10 are similarly bolted to the top plate 9 and to the uprights 8, to maintain the latter in desired positions and to protect a source of light 12 mounted on the base 6 between the uprights 8. It is believed clear without further illustration that suitable end members may be employed to close the ends of the space between the uprights (the uprights 8 closing the sides of the space), whereby to entirely enclose such space against the weather.

Figure 2:
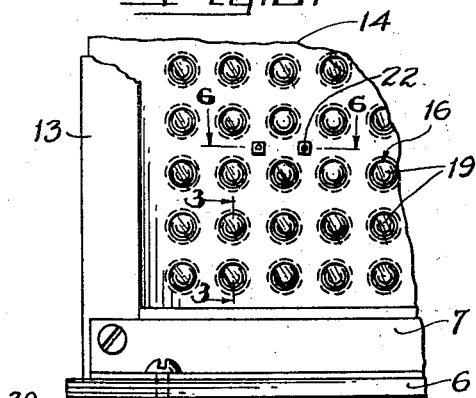
Fig. 2 is a broken elevation, looking in the direction of the arrow A of Fig. 1.
Figure 3:
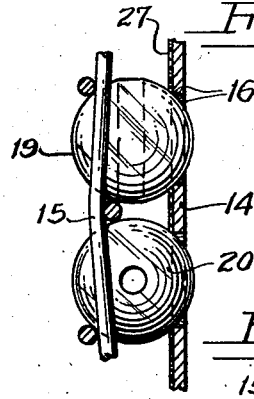
Fig. 3 is an enlarged section taken along the line 3—3 of Fig. 2.
Figure 4:
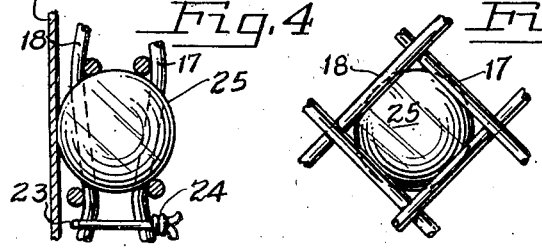
Fig. 4 is an enlarged section taken on the line 4—4 of Fig. 7.
Figure 5:
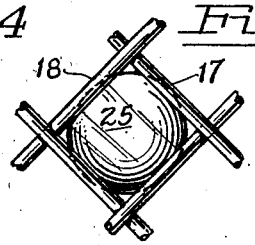
Fig. 5 is a slightly modified face view of a construction generally similar to that shown in Fig. 4, but with the wires at 45° angles to those shown in Fig. 4.

The angle irons 7 and 10 are immediately bolted to angular frame members 13. Mounted within the frame are spaced panels of suitably perforated material. The angle members 13 clamp the edges of the panels in position. It is believed clear that a wide variety of perforated material can be used. The forms shown in Figs. 1 to 3 and in Figs. 9 and 12 consist of spaced panels. The front panel 14, in Figs. 1 to 3, is a plate having series of apertures 16. These apertures 16 may be arranged in any desired pattern or patterns. The rear panel 15 in Figs. 1 to 3, is wire mesh. The form shown in Figs. 4, 5 and 7 consists of wire mesh 17 and 18 front and back. The form suggested in Figs. 9 and 12 comprises mesh panels 17 and 18. It is also believed clear without further illustration that expanded metal may also be used for either or both of the front and rear panels.

The openings of the two panels are substantially in alinement, and wedged in the opposed openings in the panels are rows or series of translucent, and, if desired, transparent lenses 19 of slightly larger diameter than the openings in the panels. In this specification, including the hereunto appended claims, it is to be understood that the word "translucent" is to be taken to mean the capacity of both transmitting light and being capable of being seen through (transparent); i. e., "translucent" is to be taken to mean not opaque; whereas, "transparent" is to be taken to mean capable of being seen through.

The lenses may be solid spheres 19 of translucent material, or may be beads, as shown at 20 in Fig. 3, or may be other shapes; e. g., cube corners as shown at 37 in Figs. 9 to 11. The lenses may of course be of colored material and may be respectively lighter and darker, to obtain contrasts and pleasing effects. Moreover, the lenses may be glass, translucent plastic, or other suitable material. In this specification, including the hereunto appended claims, the word "spheres" shall be taken to mean solid spheres and beads with apertures, and the word "lenses" shall be taken to include spheres, cube corners and other non-spherical shapes of translucent elements.

Suitable means may be used to maintain the panels against spreading apart from each other. U-bolts 21 are shown looped around a portion of the rear panel 15, and nuts 22 are screwed upon the threaded ends of the bolts against the front face of the front panel 14. In the form shown in Figs. 4, 5 and 7, wires 23 are looped around opposed parts of the wire panels 17 and 18 and the ends of the wires are twisted together, as shown at 24, to prevent separation of the panels.

The inside face of the panel 14 may be reflecting, as suggested at 27. These reflecting surfaces 27 reflect and diffuse the light from the light source 12 throughout the chamber 28, to heighten the glow of the translucent lenses.

In assembling the form shown in Fig. 7, a pattern 30 is first layed on a supporting structure (not shown). The pattern 30 may be a sheet of paper or other material bearing the desired picture, design or wording. The rear wire panel 18 is then placed upon the patterns. Lenses 25 of lighter or darker shades and/or varying colors are nested in the mesh on the rear panel 18. That is, the color and light or dark color of the pattern is followed as closely as possible by the respectively superposed spheres or lenses; i. e., correspondingly light spheres or lenses are placed on light portions of the pattern and correspondingly darker spheres or lenses are placed on darker portions of the pattern. Shades of colors in the pattern are also imitated in the spheres or lenses placed upon the respective portions of the pattern. It is to be understood that Fig. 7 is diagrammatic, and that the entire pattern is covered with corresponding shades and colors of spheres or lenses. Then the upper or outer panel 17 is placed upon the spheres or lenses.

Suitable means may be employed to hold the panels together. Wire loops 23, twisted together as suggested at 24, may be used, or it is believed clear without further illustration that U-bolt clamps 21 may also be used. A frame 13 may be used to hold the edges of the panels 17 and 18 together. As in the previous form, the frame 13 may be bolted in place by angle irons 7 upon a base 6.

Light transmitted through the thusly assembled design will reproduce the design and/or wording on the pattern 30. If it is desired to use the assembly shown in Fig. 7 as a reflector type display, the pattern 30 may be inserted in the frame 13, to be held therein, or a plain, light-colored sheet 31 may be substituted therefor. It is believed clear without further illustration that the sheet 31 may be a plain, white sheet, since such a sheet has been found to have good reflecting properties.

Figure 6:
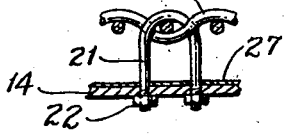
Fig. 6 is an enlarged section taken on the line 6—6 of Fig. 2, looking in the direction of the arrows.

In the form shown in Fig. 8, a substantially rigid, plain, light-colored backing sheet 31 may be used to maintain the lenses or spheres 32 in place in the woven wire mesh 33. Clamping U-bolts 34, such as shown in Fig. 6, may be employed to clamp the lenses or spheres between the backing sheet and the woven mesh.

Light 35 striking the lenses is reflected back in a path 36 parallel with the light beam 35. This is also true of other shapes of lenses (than spherical). E. g., a cube corner 37. In Fig. 9, light 38 is reflected back at 39 in a path parallel with the light beam 38. This is of distinct advantage to an airplane coming into a landing field, for it can thereby quickly find runway markers, regardless of the direction from which it approaches the field.

In the form shown in Figs. 9 to 12, a sheet 40 having triangular openings 41 is utilized to hold series of cube corners 37. A backing material 42 of a woven nature may be used.

The present display means may be employed for any of the variety of purposes suggested in this specification. In each form, the lenses diffuse the light and make a very pleasing appearance, and at a distance, the lenses lose their identities, making an attractive display.

In the different forms of the invention, the wire mesh may be white or bright wire to reflect and aid in the diffusion of the light.

It is also believed clear that the lenses may not only be colored but may be differently colored, in order to obtain different patterns or letters, or individual lenses may be in variegated colors.

While I have illustrated and described what I now regard as the preferred embodiments of my invention, the constructions are, of course, subject to modifications without departing from the spirit and scope of my invention. I, therefore, do not wish to restrict myself to the particular forms of construction illustrated and described, but desire to avail myself of all modifications that may fall within the scope of the appended claims.

Having thus described my invention, what I claim and desire to secure by Letters Patent is:

1. In a display means, including a source of light, a panel provided with circular openings and having on the inside face thereof a reflecting surface disposed toward said source of light, a plurality of translucent spherical bodies having a smaller part thereof protruding through said openings and the larger part of said bodies obstructing light from passing from the source through said openings, a companion panel of reticulate material spaced from said first-named panel and adapted to receive another smaller part of said spherical bodies to hold the larger part of said bodies between and free of said panels, said reflecting surface dispersing light from the source to the major part of said spherical bodies thereby to intensify the luminosity of the smaller part thereof exposed to view.

2. The making of polychrome pictures, designs, etc., from optical translucent bodies to produce a composite luminous polychrome picture or design, resembling dots in half tone illustration, which comprises placing a reticulate panel upon the picture or design to be reproduced, arranging on the reticulate panel groups or assemblies of translucent spherical bodies conforming in colors or shades to the colors or shades of the composition of the picture or design, placing upon the spherical bodies thus arranged a reticulate fabric having meshes of smaller cross sectional area than the diameter of said spherical bodies thereby to expose to view a part only of said bodies, tying together said panel and fabric to retain the assemblies or groups of spherical bodies in their related arrangement, and then removing the pattern picture or design from which the luminous reproduction is made.

3. In a display device, including a source of light, a panel of substantially opaque material provided with openings and having a reflecting surface disposed toward said source of light, a plurality of translucent spherical bodies having a smaller part thereof protruding through the openings in said panel and said panel obstructing a view of the larger part of said bodies, a companion panel of reticulate material spaced from said first-named panel and adapted to seat another smaller part of said bodies to hold the larger part thereof between and free of said panels, said reflecting surface dispersing light from the source to the major part of said spherical bodies to intensify the luminosity of the smaller part thereof exposed to view.

4. In a display device, a panel provided with openings, a plurality of spherical translucent bodies having the smaller parts thereof seated in and closing said openings, and a reticulate panel for seating the rear smaller parts of said bodies and holding the major parts thereof free of said panels, said first named panel having a reflecting surface on the rear face thereof to transmit light to the major portions of said spheres between said panels, thereby to intensify the lesser portions exposed to view.

5. In a display device, a sign, front and back perforate supporting members, perforations in said members being in alignment and said members being spaced apart from each other, a plurality of solid, translucent glass bodies having smaller portions thereof seated in aligned perforations of said members, the major parts of said bodies being free of and disposed in the space between said members, means holding the perforate members together and clamping the glass bodies in said perforations, and reflecting means on the back member arranged to reflect a light shining on the device at the front thereof, to the major portions of said bodies between the supporting members, thereby to intensify the lesser portions exposed to view.

6. In a display, a sign, a reticulate front supporting member providing a plurality of openings, a back supporting member carrying reflecting means facing the front member, a plurality of translucent glass bodies having smaller parts thereof seated in openings of the front member, the major parts of said bodies being free of and disposed in the space between said members, and means holding the members together with the major portions of the glass bodies between said members and the smaller portions thereof in the openings in the front member.

ROY E. SWAIN.

REFERENCES CITED

The following references are of record in the file of this patent:

UNITED STATES PATENTS

| Number | Name | Date |
| --- | --- | --- |
| 644,015 | Jean et al. | Feb. 20, 1900 |
| 777,645 | Stuart | Dec. 13, 1904 |
| 1,503,509 | Kramer | Aug. 5, 1924 |
| 1,822,084 | Ducey | Sept. 8, 1931 |
| 1,871,467 | Turk et al. | Aug. 16, 1932 |
| 1,887,534 | Wold | Nov. 15, 1932 |
| 507,952 | White | Oct. 31, 1893 |
| 2,096,360 | Heller | Oct. 19, 1937 |
| 2,122,156 | Scholtz | June 28, 1938 |
| 2,149,613 | Magnan | Mar. 7, 1939 |
| 2,154,088 | Guba | Apr. 11, 1939 |
| 2,022,639 | Stimson | Nov. 26, 1935 |

FOREIGN PATENTS

| Number | Country | Date |
| --- | --- | --- |
| 409,866 | Great Britain | May 10, 1934 |